United States Patent
Knapton

(10) Patent No.: US 12,445,048 B2
(45) Date of Patent: Oct. 14, 2025

(54) SOFT START RECTIFIER FOR A POWER SUPPLY UNIT

(71) Applicant: Dell Products L.P., Round Rock, TX (US)

(72) Inventor: Edward Douglas Knapton, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 269 days.

(21) Appl. No.: 18/325,191

(22) Filed: May 30, 2023

(65) Prior Publication Data

US 2024/0405666 A1   Dec. 5, 2024

(51) Int. Cl.
  *H02M 1/36*   (2007.01)
  *H02M 1/00*   (2007.01)
  *H02M 7/219*  (2006.01)

(52) U.S. Cl.
  CPC .......... *H02M 1/36* (2013.01); *H02M 1/0058* (2021.05); *H02M 7/219* (2013.01); *H02M 7/2195* (2021.05)

(58) Field of Classification Search
  CPC ...... H02M 7/219; H02M 7/2195; H02M 1/36; H02M 1/32
  See application file for complete search history.

(56) References Cited

U.S. PATENT DOCUMENTS

| | | | |
|---|---|---|---|
| 11,557,966 B1* | 1/2023 | Han | H02J 50/12 |
| 2016/0043657 A1* | 2/2016 | Mauder | H02M 1/36 |
| | | | 363/127 |
| 2017/0264210 A1* | 9/2017 | Minami | H02M 7/219 |
| 2018/0123473 A1* | 5/2018 | Lee | H02M 1/088 |
| 2019/0379278 A1* | 12/2019 | Niv | H02M 1/32 |
| 2021/0036632 A1* | 2/2021 | Hayashi | H02M 3/157 |
| 2022/0140657 A1* | 5/2022 | Guedon | H02M 1/0025 |
| | | | 307/149 |
| 2022/0231613 A1* | 7/2022 | Hsiao | H02M 7/219 |
| 2023/0021124 A1* | 1/2023 | Dong | H02M 7/4837 |

* cited by examiner

*Primary Examiner* — Gustavo A Rosario-Benitez
(74) *Attorney, Agent, or Firm* — McDermott Will & Schulte LLP

(57) ABSTRACT

A power supply unit (PSU), including: an active bridge rectifier, including: a plurality of field effect transistors (FETs); and a controller connected to each of the FETs; a power source connected between first and second terminals of the active bridge rectifier; and a capacitor connected between third and fourth terminals of the active bridge rectifier, wherein in a charging state: the controller performs, at a first time, zero-crossing detection of voltage of a power signal from the power source at the first and the second terminals, and in response, provides a first control signal to each of the FETs to enable each of the FETs for a fraction of a phase of current of the power signal such that the capacitor is charged during the fraction of the phase by the power signal.

13 Claims, 8 Drawing Sheets

SOFT START RECTIFIER FOR A POWER SUPPLY UNIT

BACKGROUND

Field of the Disclosure

The disclosure relates generally to a power supply unit, and in particular, a soft start active bridge rectifier for a power supply unit.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a power supply unit (PSU), including: an active bridge rectifier, including: a plurality of field effect transistors (FETs); and a controller connected to each of the FETs; a power source connected between first and second terminals of the active bridge rectifier; and a capacitor connected between third and fourth terminals of the active bridge rectifier, wherein in a charging state: the controller performs, at a first time, zero-crossing detection of voltage of a power signal from the power source at the first and the second terminals, and in response, provides a first control signal to each of the FETs to enable each of the FETs for a fraction of a phase of current of the power signal such that the capacitor is charged during the fraction of the phase by the power signal.

Other embodiments of these aspects include corresponding systems and apparatus.

These and other embodiments may each optionally include one or more of the following features. For instance, in the charging state: the controller performs, at a second time after the first time, zero-crossing detection of voltage of the power signal from the power source at the first and the second terminals, and in response, provides the first control signal to each of the FETs to enable each of the FETs for the fraction of the phase of current of the power signal such that the capacitor is charged during the fraction of the phase by the power signal. In an operating state: the controller provides a second control signal to each of the FETs to enable each of the FETs for an entirety of the phase of current of the power source signal such that a load connected between the third and the fourth terminals receives the power source signal. In the operating state: the controller determines a full charge capacity of the capacitor, and in response, provides the second control signal to each of the FETs to enable each of the FETs for the entirety of the phase of current of the power source signal such that the load connected between the third and the fourth terminals receives the power source signal. The controller is connected to a respective gate terminal of each of the FETs, wherein the controller provides the first control signal to each of the FETs to adjust a gate voltage of each of the FETs to enable each of the FETs for the fraction of the phase of current of the power signal. The controller provides the first control signal to each of the FETs to control a pulse width of the gate voltage of each of the FETs to enable each of the FETs for the fraction of the phase of current of the power signal. The power source is an alternating current (AC) power source, and the power signal is an AC power signal. The plurality of FETs include a first FET, a second FET, a third FET, and a fourth FET. The first terminal is positioned between the first FET and the fourth FET; the second terminal is positioned between the second FET and the third FET; the third terminal is positioned between the first FET and the second FET; and the fourth terminal is positioned between third FET and the fourth FET. The fraction of the phase of current of the power signal is based on a magnitude of a capacitance of the capacitor.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
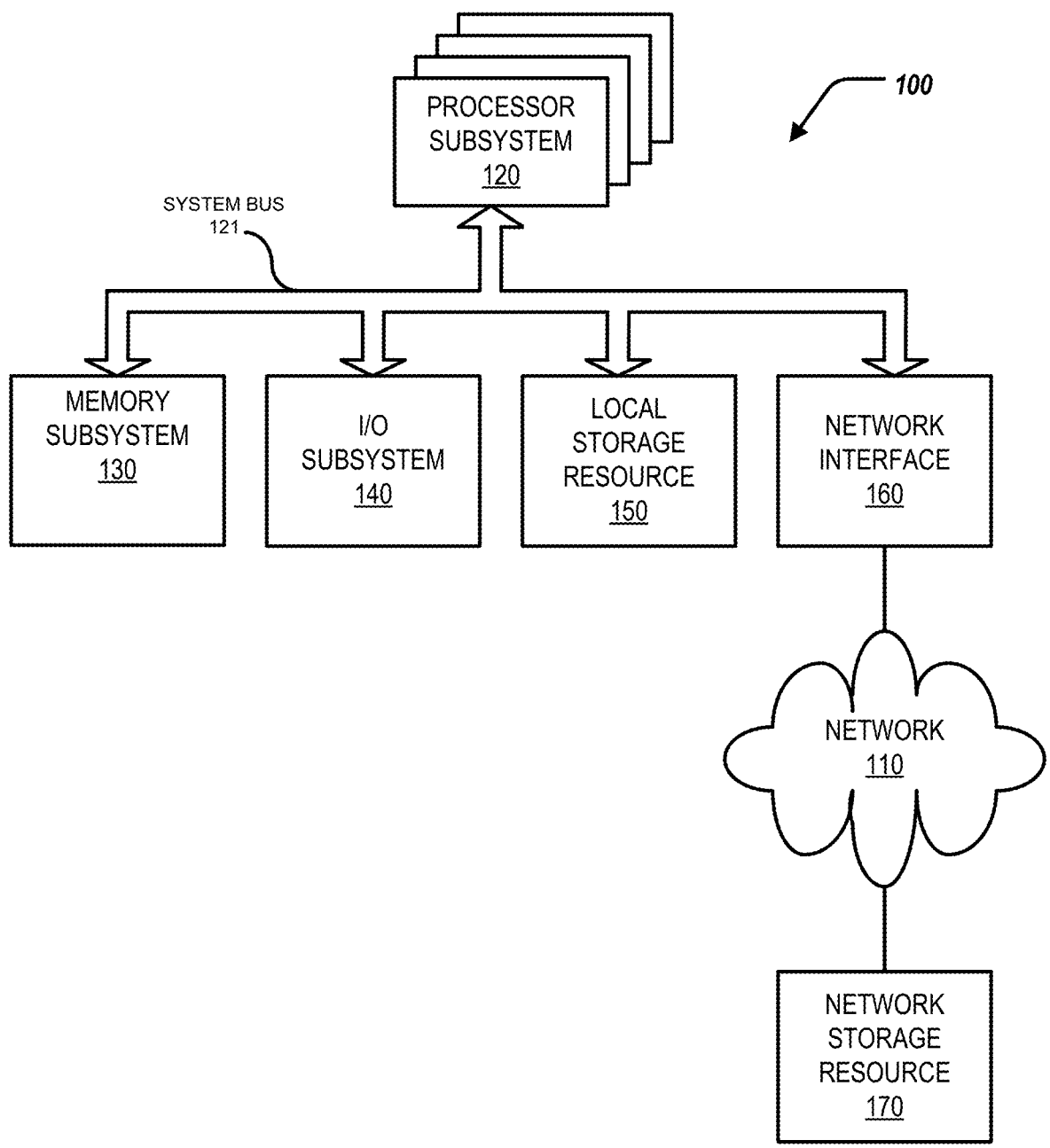
FIG. 1 is a block diagram of selected elements of an embodiment of an information handling system.

This disclosure discusses a power supply unit for an information handling system. In short, a controller can perform zero-crossing detection of power provided by a power source, and in combination with a bridge rectifier, can limit current surging provided to a capacitor of the power supply unit (e.g., a "soft start.")

Specifically, this disclosure discusses a power supply unit (PSU), including: an active bridge rectifier, including: a plurality of field effect transistors (FETs); and a controller connected to each of the FETs; a power source connected between first and second terminals of the active bridge rectifier; and a capacitor connected between third and fourth terminals of the active bridge rectifier, wherein in a charging state: the controller performs, at a first time, zero-crossing detection of voltage of a power signal from the power source at the first and the second terminals, and in response, provides a first control signal to each of the FETs to enable each of the FETs for a fraction of a phase of current of the power signal such that the capacitor is charged during the fraction of the phase by the power signal.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, desktop computers, media players, digital cameras, 2-in-1 tablet-laptop-combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
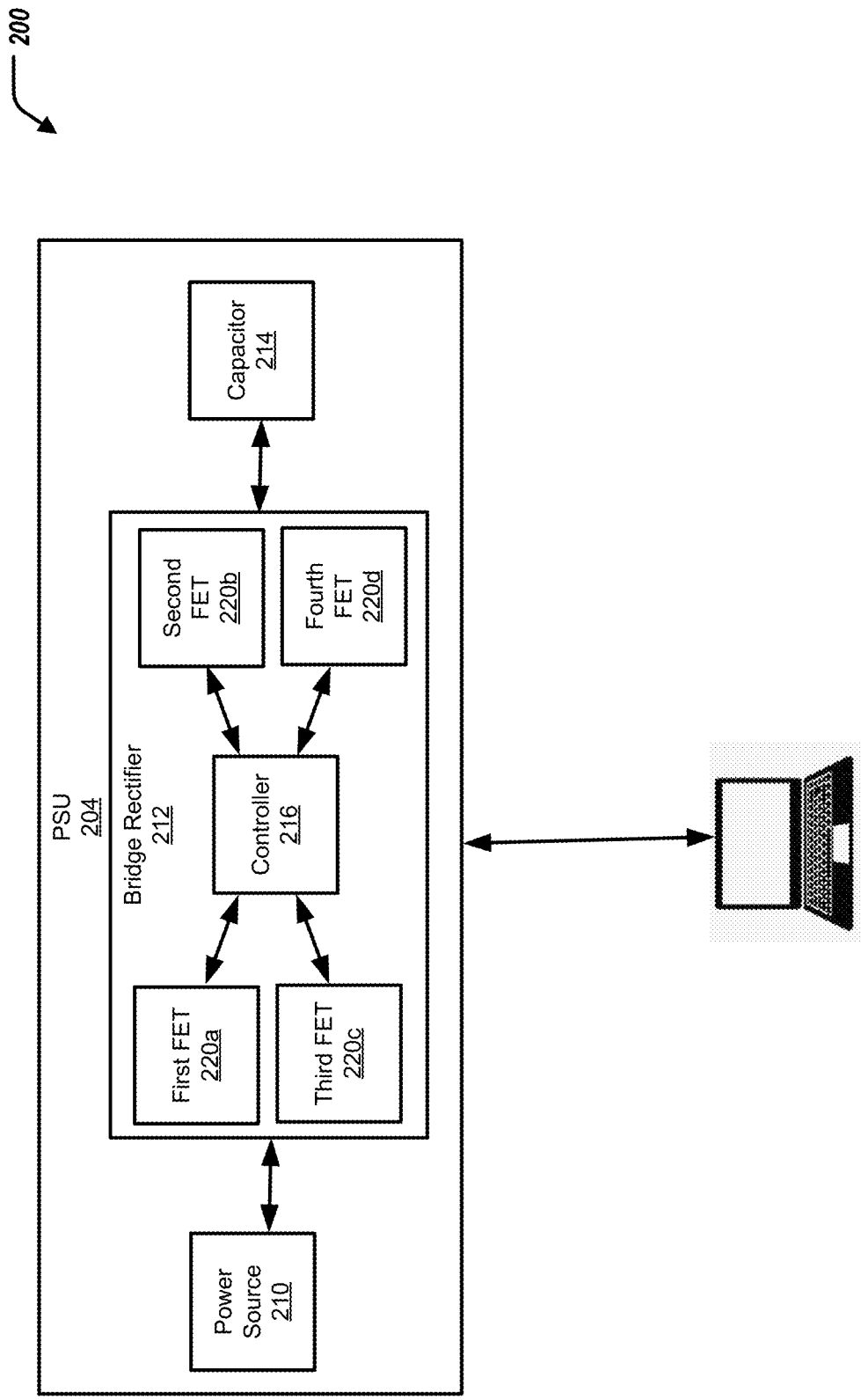
FIG. 2 illustrates a block diagram of a computing environment including an information handling system and a power supply unit.

Turning to FIG. 2, FIG. 2 illustrates an environment 200 including an information handling system 202 and a power supply unit (PSU) 204. In some examples, the information handling system 202 is similar to, or includes, the information handling system 100 of FIG. 1.

The PSU 204 includes a power source 210, a bridge rectifier 212, and a capacitor 214.

The bridge rectifier 212 can include a first field-effect transistor (FET) 220a, a second FET 220b, a third FET 220c, and a fourth FET 220d (collectively referred to as FETs 220). In some examples, the FETs 220 are metal-oxide-semiconductor field-effect transistors (MOSFETs). The bridge rectifier 212 can further include a controller 216.

In some examples, the capacitor 214 is a bulk high voltage capacitor.

In some examples, the power source 210 is an alternating current (AC) power source.

The bridge rectifier 212 can be in electrical communication with the power source 210 and the capacitor 214.

The controller 216 can be in electrical communication with each of the FETs 220.

In short, the controller 216 can perform zero-crossing detection of power provided by the power source 210, and in combination with the bridge rectifier 212, can limit current surging provided to the capacitor 214 (e.g., a "soft start.")

Figure 3:
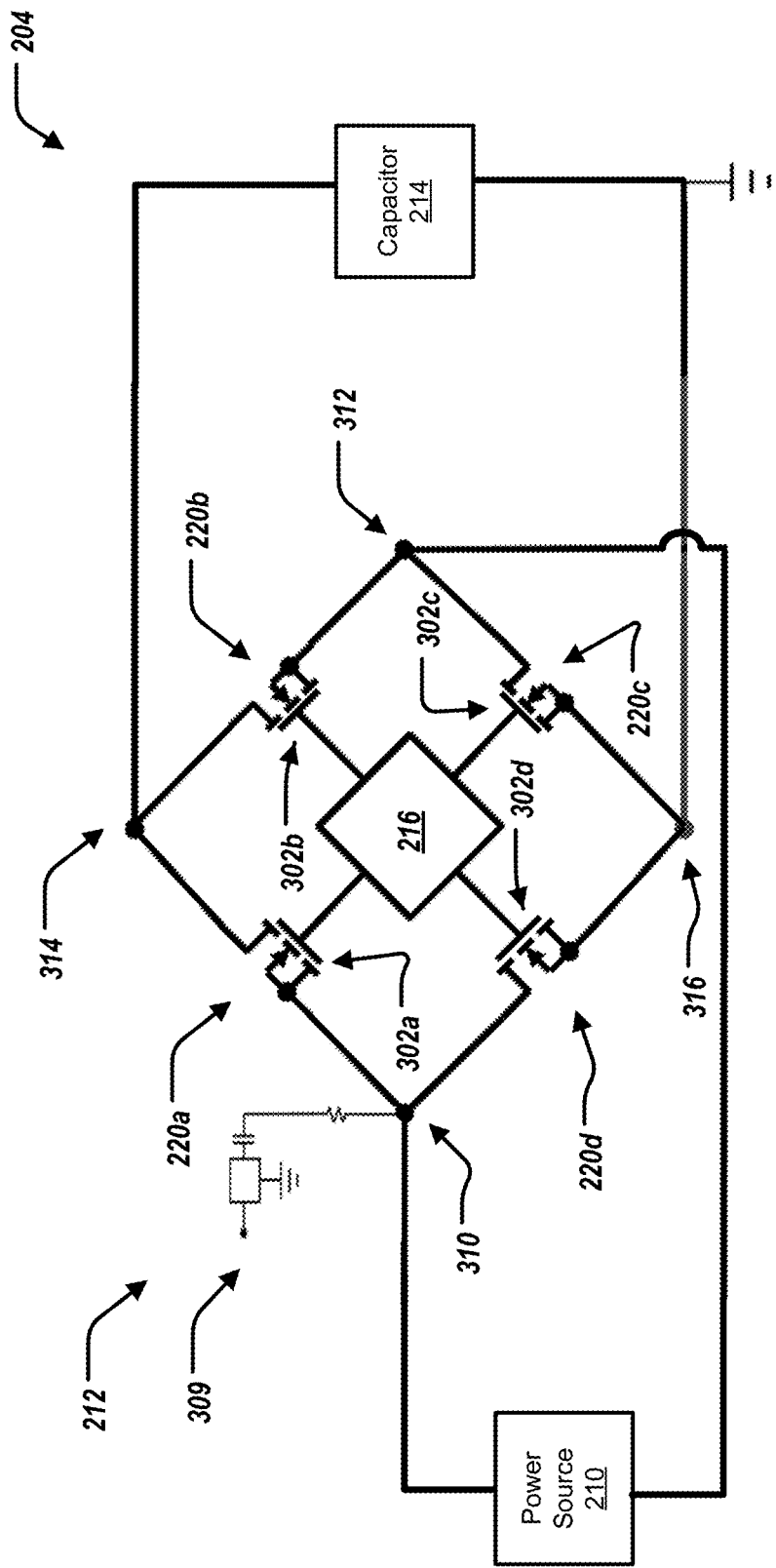
FIG. 3 illustrates the power supply unit including a schematic representation of a bridge rectifier.

FIG. 3 illustrates a portion of the PSU 204, including a schematic representation of the bridge rectifier 212. The bridge rectifier 212 (or active bridge rectifier 212) includes a plurality of field-effect transistors (FETs), including the first FET 220a, the second FET 220b, the third FET 220c, and the fourth FET 220d (collectively referred to as FETs 220). Each of the FETs 220 can include a gate terminal. Specifically, the first FET 220a can include a first gate terminal 302a, the second FET 220b can include a second gate terminal 302b, the third FET 220c can include a third gate terminal 302c, and the fourth FET 220d can include a fourth gate terminal 302d (collectively referred to as gate terminals 302).

The controller 216 can be connected to each of the FETs 220. Specifically, the controller 216 can be connected to the gate terminals 302 of each of the FETs 220.

The power source 210 is connected between a first terminal 310 and a second terminal 312 of the bridge rectifier 212. The power source 210 can be an alternating current (AC) power source.

The capacitor 214 is connected between a third terminal 314 and a fourth terminal 316 of the bridge rectifier 214.

A bootstrap voltage source 309 can be connected at the first terminal 310.

The first terminal 310 is positioned between the first FET 220a and the fourth FET 220d. The second terminal 312 is positioned between the second FET 220b and the third FET 220c. The third terminal 314 is positioned between the first FET 220a and the second FET 220b. The fourth terminal 316 is positioned between the third FET 220c and the fourth FET 220d.

In some examples, the PSU 204, and in particular, the bridge rectifier 212, can be in an off-state. Specifically, when the power source 210 does not provide a power signal to the bridge rectifier 212, the FETs 220 can be in an off-state (power off-state). However, the controller 216 can receive an additional power signal from the bootstrap voltage source 309 to be in an on-state to detect when the power source 212 provides the power signal, including zero-crossing detection of the voltage of the power signal from the power source 212.

Figure 4:
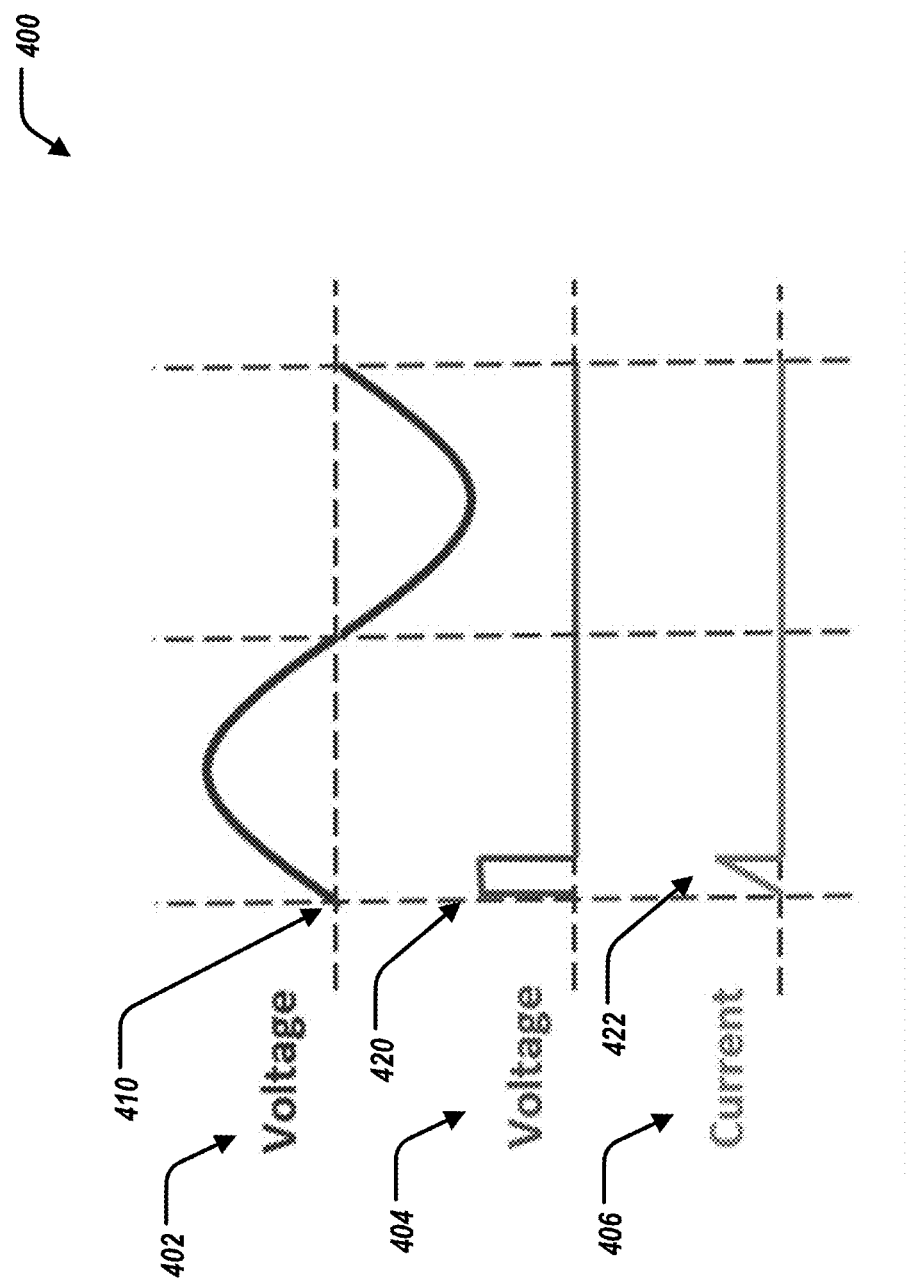
FIG. 4 illustrates a graph of the power supply unit in a charging state.

In some examples, the PSU 204, and in particular, the bridge rectifier 212, can be in a charging state. That is, the controller 216 can perform, at a first time, a zero-crossing detection of the voltage of the power signal from the power source 210 at the terminals 310, 312. FIG. 4 illustrates a graph 400 illustrating the voltage 402 of the power signal at the first terminal 310, the voltage 404 at each of the gate terminals 302 of each of the FETs 220, and the current 406 provided to the capacitor 214.

The controller 216 can determine the zero-crossing detection, at point 410, of the voltage of the power signal from the power source 210. For example, the power signal is an AC power signal. The controller 216, in response to determining the zero-crossing detection of the voltage of the power signal from the power source 210, provides a first control signal to each of the FETs 220 to enable each of the FETs 220. In particular, the controller 216, in response to determining the zero-crossing detection of the voltage of the power signal from the power source 210, provides a first control signal to each of the FETs 220 to adjust a gate voltage of each of the FETs 220 to enable each of the FETs 220. Specifically, the controller 216, in response to determining the zero-crossing detection of the voltage of the power signal from the power source 210, provides a first control signal to each of the FETs 220 to control a pulse width of a gate voltage of each of the FETs 220 to enable each of the FETs 220.

The controller 216 provides the first control signal to each of the FETs 220 to enable each of the FETs 220 for a fraction of a phase of the current of the power signal. Referring to FIG. 4, the voltage 404 at each of the gate terminals 302 of each of the FETs 220, in response to the first control signal, is enabled for a duration 420, the duration 420 being a fraction of the phase of the current of the power signal. In particular, the controller 216 provides the first control signal to each of the FETs 220 to adjust the gate voltage of each of the FETs 220 to enable each of the FETs 220 for a fraction of a phase of the current of the power signal. Specifically, the controller 216 provides the first control signal to each of the FETs 220 to adjust the gate voltage of each of the FETs 220 to control a pulse width of a gate voltage of each of the FETs 220 to enable each of the FETs 220 for a fraction of a phase of the current of the power signal.

To that end, when the controller 216 provides the first control signal such that the FETs 220 are enabled for the fraction of the phase of the current of the power signal, the FETs 220 facilitate providing the current to the capacitor 214 such that the capacitor 214 is charged during such fraction of the phase of the power signal. Referring to FIG. 4, the current 406 is provided to the capacitor 214 for the duration 422 that is aligned with the duration 420 that the FETs 220 are enabled (i.e., voltage 404 at the gate terminals 302 of each of the FETs 220). In particular, when the controller 216 provides the first control signal to each of the FETs 220 to adjust the gate voltage of each of the FETs 220 to enable each of the FETs 220 for the fraction of the phase of the current of the power signal, the FETs 220 facilitate providing the current to the capacitor 214 such that the capacitor 214 is charged during such fraction of the phase of the power signal. Specifically, when the controller 216 provides the first control signal to each of the FETs 220 to adjust the gate voltage of each of the FETs 220 to control a pulse width of a gate voltage of each of the FETs 220 to enable each of the FETs 220 for the fraction of the phase of the current of the power signal, the FETs 220 facilitate providing the current to the capacitor 214 such that the capacitor 214 is charged during such fraction of the phase of the power signal.

As a result, the controller 216 is able to limit the current 406 that is provided to the capacitor 216 at "startup" or initialization of the PSU 204—i.e., limiting in-rush current.

In some examples, the fraction of the phase of the current of the power signal—i.e., the durations 420 and 422—can be based on a magnitude of the capacitance of the capacitor 214. For example, a larger magnitude of the capacitance of the capacitor 214 can result in a larger fraction of the phase of the current of the power signal.

In some examples, the bridge rectifier 213 can limit the current 406 that is provided to the capacitor 214 at "startup" or initialization of the PSU 204 for multiple cycles of the power signal. That is, the controller 216 can perform, at a second time after the first time, a zero-crossing detection of the voltage of the power signal from the power source 210 at the terminals 310, 312. The controller 216, in response to determining the zero-crossing detection of the voltage of the power signal from the power source 210, provides the first control signal to each of the FETs 220 to enable each of the FETs 220. The controller 216 provides the first control signal to each of the FETs 220 to enable each of the FETs 220 for a fraction of a phase of the current of the power signal. When the controller 216 provides the first control signal such that the FETs 220 are enabled for the fraction of the phase of the current of the power signal, the FETs 220 facilitate providing the current to the capacitor 214 such that the capacitor 214 is charged during such fraction of the phase of the power signal.

Figure 5:
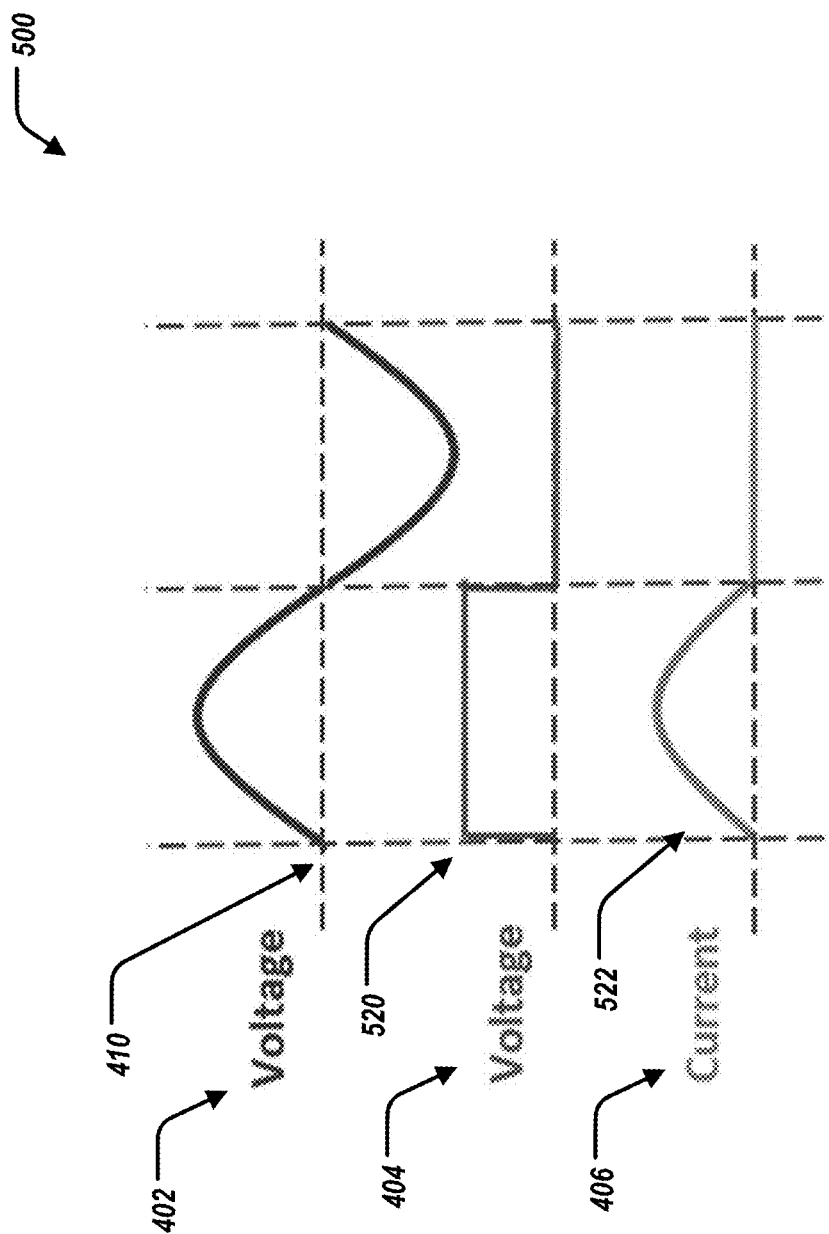
FIG. 5 illustrates a graph of the power supply unit in an operating state.

In some examples, the PSU 204, and in particular, the bridge rectifier 212, can be in an operating state. In some examples, the operating state is after the charging state. That is, the controller 216 can determine that the capacitor 214 has a full charge capacity. The controller 216, in response to such determination, provides a second control signal to each of the FETs 220 to enable each of the FETs 220 for an entirety of a phase of the current of the power signal. FIG. 5 illustrates a graph 500 illustrating the voltage 402 of the power signal at the first terminal 310, the voltage 404 at each of the gate terminals 302 of each of the FETs 220, and the current 406 provided to the capacitor 214.

The voltage 404 at each of the gate terminals 302 of each of the FETs 220, in response to the second control signal, is enabled for a duration 520, the duration 520 being an entirety of the phase of the current of the power signal. In particular, the controller 216 provides the second control signal to each of the FETs 220 to adjust the gate voltage of each of the FETs 220 to enable each of the FETs 220 for the entirety of the phase of the current of the power signal.

To that end, when the controller 216 provides the second control signal such that the FETs 220 are enabled for the entirety of the phase of the current of the power signal, the FETs 220 facilitate providing the current downstream to a load connected between the third terminal 314 and the fourth terminal 216 (e.g., any remaining stages of the PSU 204). Referring to FIG. 5, the current 406 is provided for the duration 522 that is aligned with the duration 520 that the FETs 220 are enabled (i.e., voltage 404 at the gate terminals 302 of each of the FETs 220). In particular, when the controller 216 provides the first control signal to each of the FETs 220 to adjust the gate voltage of each of the FETs 220 to enable each of the FETs 220 for the entirety of the phase of the current of the power signal, the FETs 220 facilitate providing the current such that a load connected between the third terminal 314 and the fourth terminal 216 receives the power source signal (e.g., any remaining stages of the PSU 204).

Figure 6:
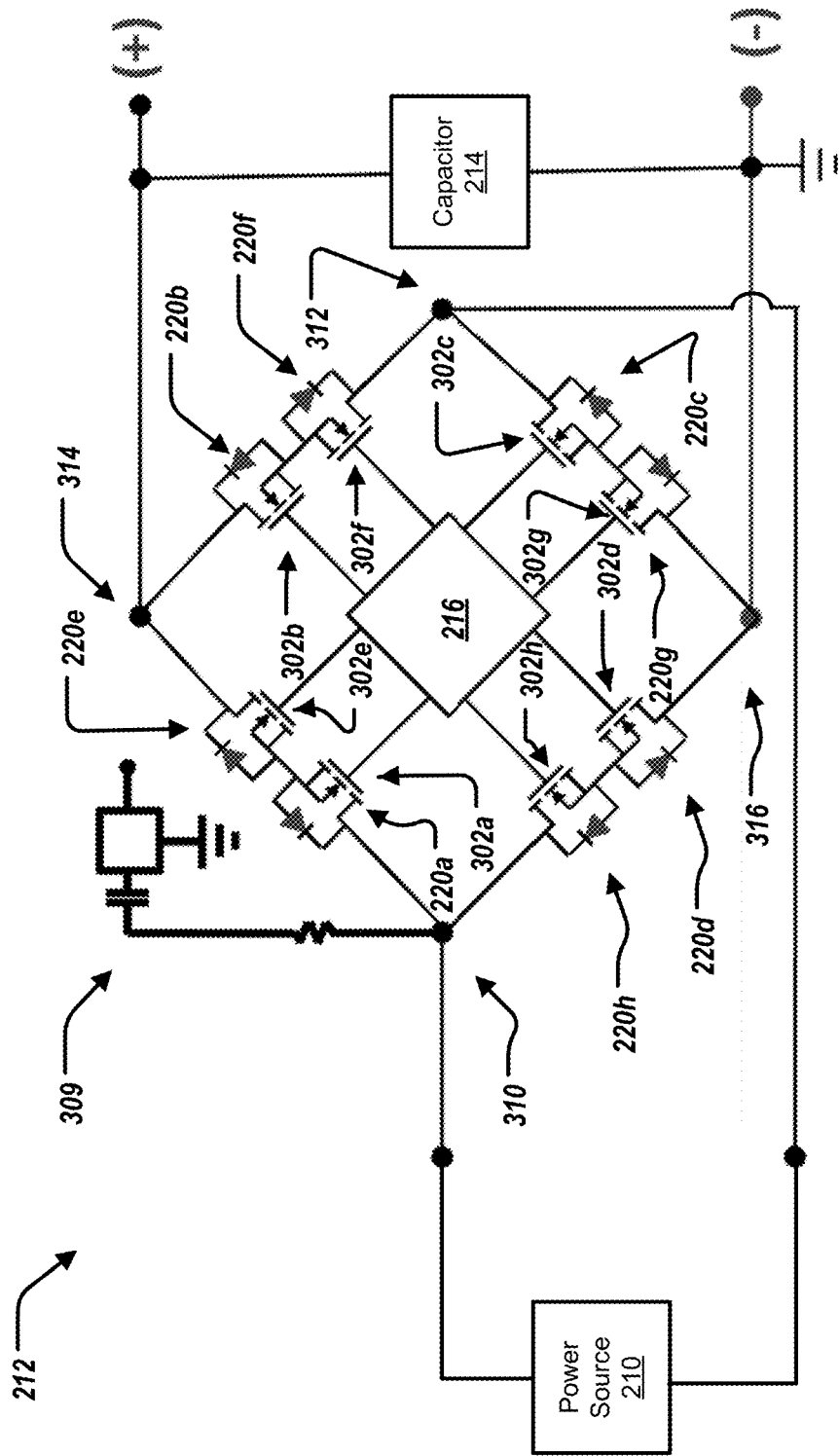
FIG. 6 illustrates the power supply unit including a schematic representation of a bridge rectifier, in a further implementation.

FIG. 6 illustrates a further implementation of a portion of the PSU 204, including a schematic representation of the bridge rectifier 212. The bridge rectifier 212 (or active bridge rectifier 212) includes a plurality of field-effect transistors (FETs), including the first FET 220a, the second FET 220b, the third FET 220c, the fourth FET 220d, a fifth FET 220e, a sixth FET 220f, a seventh FET 220g, and an eighth FET 220h (collectively referred to as FETs 220). Each of the FETs 220 can include a gate terminal. Specifically, the first FET 220a can include the first gate terminal 302a, the second FET 220b can include the second gate terminal 302b, the third FET 220c can include the third gate terminal 302c, the fourth FET 220d can include the fourth gate terminal 302d, the fifth FET 220e can include a fifth gate terminal 302e, the sixth FET 220f can include a sixth gate terminal 302f, the seventh FET 220g can include a seventh gate terminal 302g, and the eighth FET 220h can include an eighth gate terminal 302h (collectively referred to as gate terminals 302).

The controller 216 can be connected to each of the FETs 220. Specifically, the controller 216 can be connected to the gate terminals 302 of each of the FETs 220.

The power source 210 is connected between the first terminal 310 and the second terminal 312 of the bridge rectifier 212. The power source 210 can be an alternating current (AC) power source.

The capacitor 214 is connected between the third terminal 314 and the fourth terminal 316 of the bridge rectifier 214.

The bootstrap voltage source 309 can be connected at the first terminal 310.

The first terminal 310 is positioned between the first FET 220a and the eighth FET 220h. The second terminal 312 is positioned between the sixth FET 220f and the third FET 220c. The third terminal 314 is positioned between fifth FET 220e and the second FET 220b. The fourth terminal 316 is positioned between the seventh FET 220g and the fourth FET 220d.

In some examples, the PSU 204, and in particular, the bridge rectifier 212, can be in an off-state. Specifically, when the power source 210 does not provide a power signal to the bridge rectifier 212, the FETs 220 can be in an off-state (power off-state). However, the controller 216 can receive an additional power signal from the bootstrap voltage source 309 to be in an on-state to detect when the power source 212 provides the power signal, including zero-crossing detection of the voltage of the power signal from the power source 212.

Figure 7:
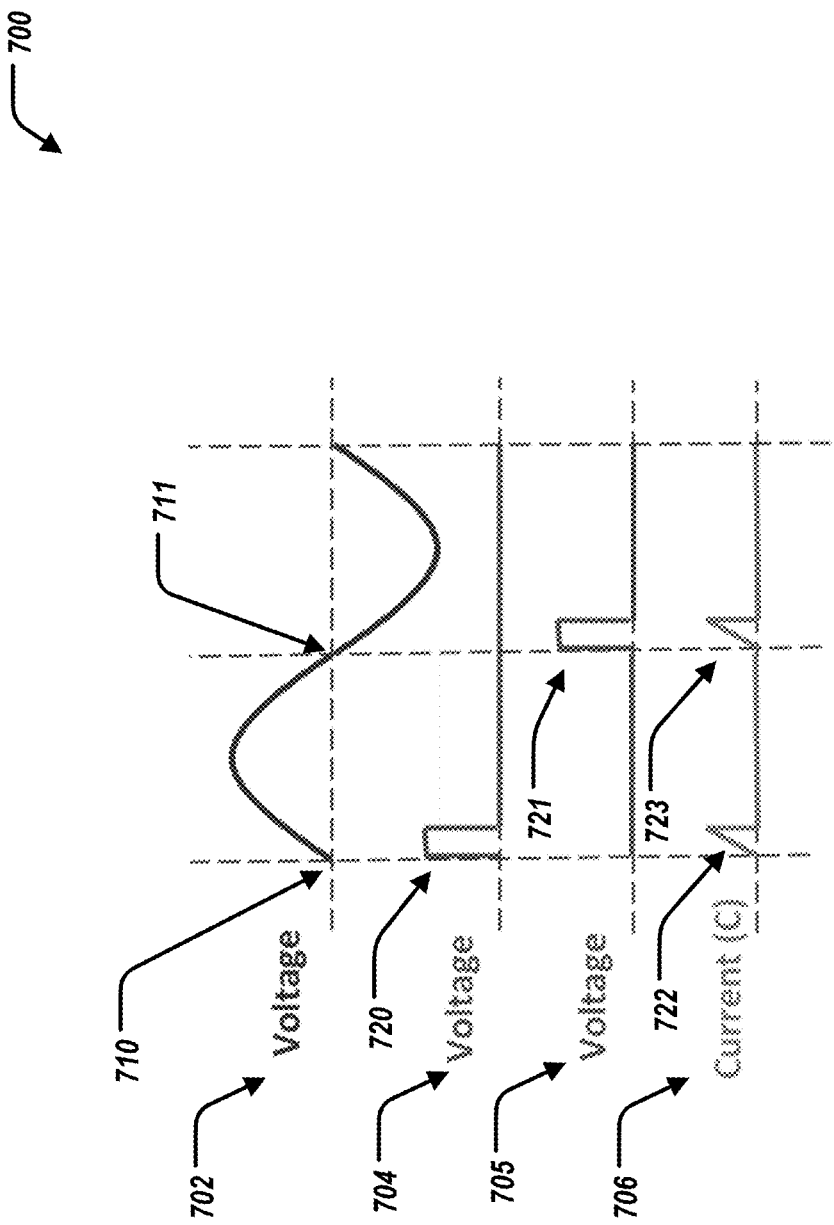
FIG. 7 illustrates a graph of the power supply unit in a charging state, in a further implementation.

In some examples, the PSU 204, and in particular, the bridge rectifier 212, can be in a charging state. That is, the controller 216 can perform, at a first time, a zero-crossing detection of the voltage of the power signal from the power source 210 at the terminals 310, 312. FIG. 7 illustrates a graph 700 illustrating the voltage 702 of the power signal at the first terminal 310; the voltage 704 at each of the gate terminals 302a, 302b, 302c, 302d of each of the FETs 220a, 220b, 220c, 220d, respectively; the voltage 705 at each of the gate terminals 302e, 302f, 302g, 302h of each of the FETs 220e, 220f, 220g, 220h; and the current 706 provided to the capacitor 214.

The controller 216 can determine the zero-crossing detection, at point 710, of the voltage of the power signal from the power source 210. For example, the power signal is an AC power signal. The controller 216, in response to determining the zero-crossing detection of the voltage of the power signal from the power source 210, provides a first control signal to each of the FETs 220a, 220b, 220c, 220d to enable each of the FETs 220a, 220b, 220c, 220d. In particular, the controller 216, in response to determining the zero-crossing detection of the voltage of the power signal from the power source 210, provides a first control signal to each of the FETs 220a, 220b, 220c, 220d to adjust a gate voltage of each of the FETs 220a, 220b, 220c, 220d to enable each of the FETs 220a, 220b, 220c, 220d. Specifically, the controller 216, in response to determining the zero-crossing detection of the voltage of the power signal from the power source 210, provides a first control signal to each of the FETs 220a, 220b, 220c, 220d to control a pulse width of a gate voltage of each of the FETs 220a, 220b, 220c, 220d to enable each of the FETs 220a, 220b, 220c, 220d.

The controller 216 provides the first control signal to each of the FETs 220a, 220b, 220c, 220d to enable each of the FETs 220a, 220b, 220c, 220d for a fraction of a phase of the current of the power signal. Referring to FIG. 7, the voltage 704 at each of the gate terminals 302a, 302b, 302c, 302d of each of the FETs 220a, 220b, 220c, 220d, in response to the first control signal, is enabled for a duration 720, the duration 720 being a fraction of the phase of the current of the power signal. In particular, the controller 216 provides the first control signal to each of the FETs 220a, 220b, 220c, 220d to adjust the gate voltage of each of the FETs 220a, 220b, 220c, 220d to enable each of the FETs 220a, 220b, 220c, 220d for a fraction of a phase of the current of the power signal. Specifically, the controller 216 provides the first control signal to each of the FETs 220a, 220b, 220c, 220d to adjust the gate voltage of each of the FETs 220a, 220b, 220c, 220d to control a pulse width of a gate voltage of each of the FETs 220a, 220b, 220c, 220d to enable each of the FETs 220a, 220b, 220c, 220d for a fraction of a phase of the current of the power signal.

To that end, when the controller 216 provides the first control signal such that the FETs 220a, 220b, 220c, 220d are enabled for the fraction of the phase of the current of the power signal, the FETs 220a, 220b, 220c, 220d facilitate providing the current to the capacitor 214 such that the capacitor 214 is charged during such fraction of the phase of the power signal. Referring to FIG. 7, the current 706 is provided to the capacitor 214 for the duration 722 that is aligned with the duration 720 that the FETs 220a, 220b, 220c, 220d are enabled (i.e., voltage 704 at the gate terminals 302a, 302b, 302c, 302d of each of the FETs 220a, 220b, 220c, 220d). In particular, when the controller 216 provides the first control signal to each of the FETs 220a, 220b, 220c, 220d to adjust the gate voltage of each of the FETs 220a, 220b, 220c, 220d to enable each of the FETs 220a, 220b, 220c, 220d for the fraction of the phase of the current of the power signal, the FETs 220a, 220b, 220c, 220d facilitate providing the current to the capacitor 214 such that the capacitor 214 is charged during such fraction of the phase of the power signal. Specifically, when the controller 216 provides the first control signal to each of the FETs 220a, 220b, 220c, 220d to adjust the gate voltage of each of the FETs 220a, 220b, 220c, 220d to control a pulse width of a gate voltage of each of the FETs 220a, 220b, 220c, 220d to enable each of the FETs 220a, 220b, 220c, 220d for the fraction of the phase of the current of the power signal, the FETs 220a, 220b, 220c, 220d facilitate providing the current to the capacitor 214 such that the capacitor 214 is charged during such fraction of the phase of the power signal.

The controller 216 can determine a further zero-crossing detection, at point 711, of the voltage of the power signal from the power source 210. For example, the power signal is an AC power signal. The controller 216, in response to determining the zero-crossing detection of the voltage of the power signal from the power source 210, provides a first control signal to each of the FETs 220e, 220f, 220g, 220h to enable each of the FETs 220e, 220f, 220g, 220h. In particular, the controller 216, in response to determining the zero-crossing detection of the voltage of the power signal from the power source 210, provides an additional first control signal to each of the FETs 220e, 220f, 220g, 220h to adjust a gate voltage of each of the FETs 220e, 220f, 220g, 220h to enable each of the FETs 220e, 220f, 220g, 220h. Specifically, the controller 216, in response to determining the zero-crossing detection of the voltage of the power signal from the power source 210, provides an additional first control signal to each of the FETs 220e, 220f, 220g, 220h to control a pulse width of a gate voltage of each of the FETs 220e, 220f, 220g, 220h to enable each of the FETs 220e, 220f, 220g, 220h.

Further, the controller 216 provides the additional first control signal to each of the FETs 220e, 220f, 220g, 220h to enable each of the FETs 220e, 220f, 220g, 220h for a fraction of a phase of the current of the power signal. Referring to FIG. 7, the voltage 704 at each of the gate terminals 302e, 302f, 302g, 302h of each of the FETs 220e, 220f, 220g, 220h, in response to the additional first control signal, is enabled for a duration 721, the duration 721 being a fraction of the phase of the current of the power signal. In particular, the controller 216 provides the first control signal to each of the FETs 220e, 220f, 220g, 220h to adjust the gate voltage of each of the FETs 220e, 220f, 220g, 220h to enable each of the FETs 220e, 220f, 220g, 220h for a fraction of a phase of the current of the power signal. Specifically, the controller 216 provides the additional first control signal to each of the FETs 220e, 220f, 220g, 220h to adjust the gate voltage of each of the FETs 220e, 220f, 220g, 220h to control a pulse width of a gate voltage of each of the FETs 220e, 220f, 220g, 220h to enable each of the FETs 220e, 220f, 220g, 220h for a fraction of a phase of the current of the power signal.

To that end, when the controller 216 provides the first control signal such that the FETs 220e, 220f, 220g, 220h are enabled for the fraction of the phase of the current of the power signal, the FETs 220e, 220f, 220g, 220h facilitate providing the current to the capacitor 214 such that the capacitor 214 is charged during such fraction of the phase of the power signal. Referring to FIG. 7, the current 706 is provided to the capacitor 214 for the duration 723 that is aligned with the duration 721 that the FETs 220e, 220f, 220g, 220h are enabled (i.e., voltage 704 at the gate terminals 302e, 302f, 302g, 302h of each of the FETs 220e, 220f, 220g, 220h). In particular, when the controller 216 provides the first control signal to each of the FETs 220e, 220f, 220g, 220h to adjust the gate voltage of each of the FETs 220e, 220f, 220g, 220h to enable each of the FETs 220e, 220f, 220g, 220h for the fraction of the phase of the current of the power signal, the FETs 220e, 220f, 220g, 220h facilitate providing the current to the capacitor 214 such that the capacitor 214 is charged during such fraction of the phase of the power signal. Specifically, when the controller 216 provides the additional first control signal to each of the FETs 220e, 220f, 220g, 220h to adjust the gate voltage of each of the FETs 220e, 220f, 220g, 220h to control a pulse width of a gate voltage of each of the FETs 220e, 220f, 220g, 220h to enable each of the FETs 220e, 220f, 220g, 220h for the fraction of the phase of the current of the power signal, the FETs 220e, 220f, 220g, 220h facilitate providing the current to the capacitor 214 such that the capacitor 214 is charged during such fraction of the phase of the power signal.

As a result, the controller 216 is able to limit the current 706 that is provided to the capacitor 216 at "startup" or initialization of the PSU 204—i.e., limiting in-rush current.

In some examples, the fraction of the phase of the current of the power signal—i.e., the durations 720, 721, 722, 723—can be based on a magnitude of the capacitance of the capacitor 214. For example, a larger magnitude of the capacitance of the capacitor 214 can result in a larger fraction of the phase of the current of the power signal.

Figure 8:
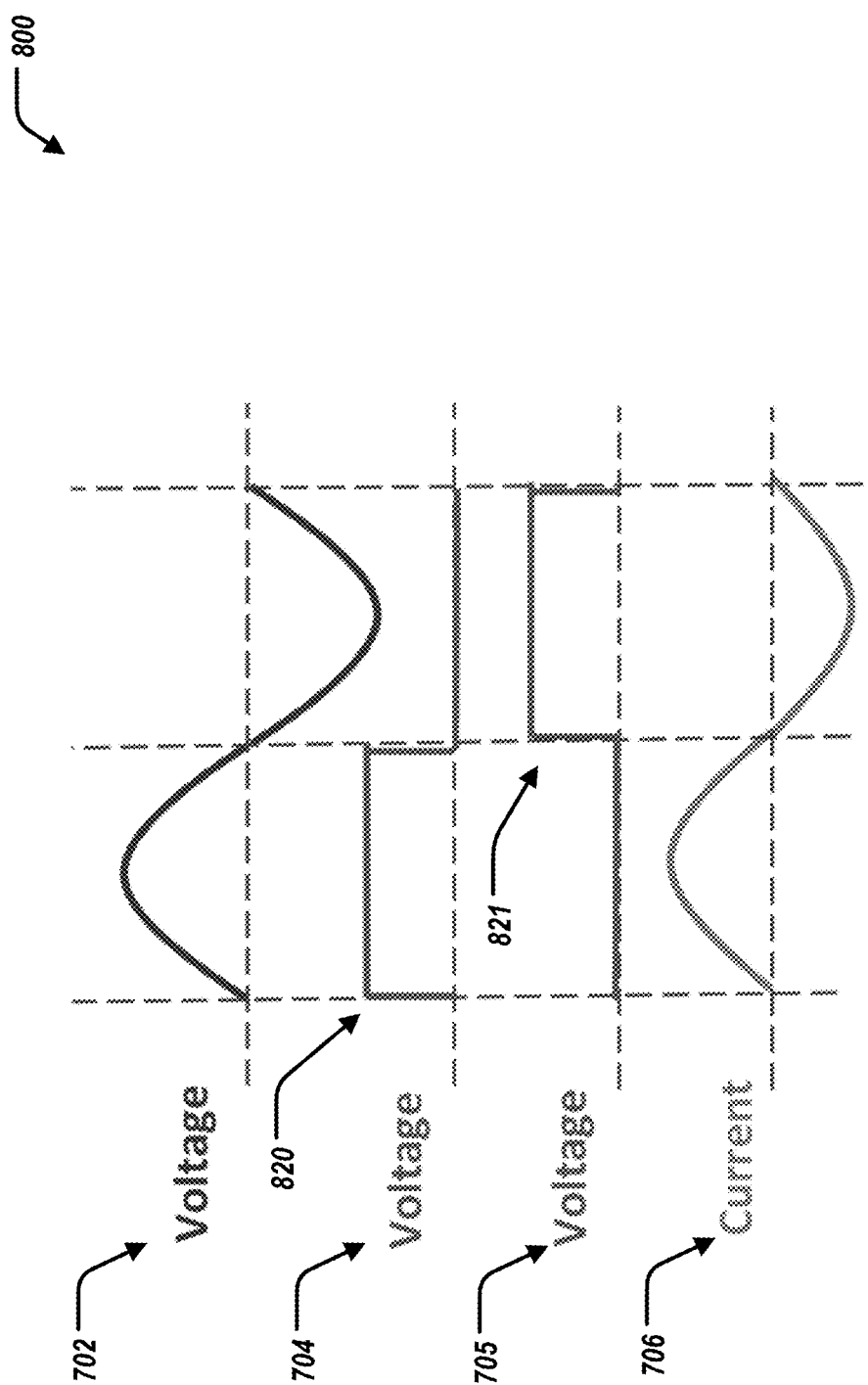
FIG. 8 illustrates a graph of the power supply unit in an operating state, in a further implementation.

In some examples, the PSU 204, and in particular, the bridge rectifier 212, can be in an operating state. In some examples, the operating state is after the charging state. That is, the controller 216 can determine that the capacitor 214 has a full charge capacity. The controller 216, in response to such determination, provides a second control signal to each of the FETs 220 to enable a subset of the FETs 220 for an entirety of a phase of the current of the power signal. FIG. 8 illustrates a graph 800 illustrating the voltage 702 of the power signal at the first terminal 310; the voltages 704 at each of the gate terminals 302a, 302b, 302c, 302d of each of the FETs 220a, 220b, 220c, 220d; the voltages 705 at each of the gate terminals 302e, 302f, 302g, 302d of each of the FETs 220e, 220f, 220g, 220h; and the current 706 provided to the capacitor 214.

The voltage 704 at each of the gate terminals 302a, 302b, 302c, 302d of each of the FETs 220a, 220b, 220c, 220d, in response to the second control signal, is enabled for a duration 820, the duration 820 being an entirety of the phase of the current of the power signal. In particular, the controller 216 provides the second control signal to each of the FETs 220a, 220b, 220c, 220d to adjust the gate voltage of each of the FETs 220a, 220b, 220c, 220d to enable each of the FETs 220 for the entirety of the phase of the current of the power signal. Further, the voltage 705 at each of the gate terminals 302e, 302f, 302g, 302d of each of the FETs 220e, 220f, 220g, 220h, in response to the second control signal, is enabled for a duration 821, the duration 821 being an entirety of the phase of the current of the power signal. In particular, the controller 216 provides the second control signal to each of the FETs 220e, 220f, 220g, 220h to adjust the gate voltage of each of the FETs 220e, 220f, 220g, 220h to enable each of the FETs 220 for the entirety of the phase of the current of the power signal.

To that end, when the controller 216 provides the second control signal, the FETs 220 facilitate providing the current downstream to a load connected between the third terminal 314 and the fourth terminal 216 (e.g., any remaining stages of the PSU 204). Referring to FIG. 8, the current 706 is provided for the duration 820, 821 that is aligned with the durations 820, 821, respectively, that the respective FETs 220 are enabled.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A power supply unit (PSU), including:
   an active bridge rectifier, including:
      a plurality of field effect transistors (FETs), including a first FET, a second FET, a third FET, and a fourth FET; and
      a controller connected to each of the FETs;
   a power source connected between first and second terminals of the active bridge rectifier; and
   a capacitor connected between third and fourth terminals of the active bridge rectifier,
   wherein the first terminal is positioned between the first FET and the fourth FET; the second terminal is positioned between the second FET and the third FET; the third terminal is positioned between the first FET and the second FET; and the fourth terminal is positioned between third FET and the fourth FET;
   wherein in a charging state:
      the controller performs, at a first time, zero-crossing detection of a voltage of a power signal from the power source at the first and the second terminals, and in response, provides a first control signal to each of the FETs to enable each of the FETs for a fraction of a phase of current of the power signal such that the capacitor is charged during the fraction of the phase by the power signal, and
   wherein the fraction of the phase of current of the power signal is based on a magnitude of a capacitance of the capacitor.

2. The PSU of claim 1, wherein in the charging state:
   the controller performs, at a second time after the first time, zero-crossing detection of voltage of the power signal from the power source at the first and the second terminals, and in response, provides the first control signal to each of the FETs to enable each of the FETs for the fraction of the phase of current of the power signal such that the capacitor is charged during the fraction of the phase by the power signal.

3. The PSU of claim 1, wherein in an operating state:
   the controller provides a second control signal to each of the FETs to enable each of the FETs for an entirety of the phase of current of the power source signal such that a load connected between the third and the fourth terminals receives the power source signal.

4. The PSU of claim 3, wherein in the operating state:
   the controller determines a full charge capacity of the capacitor, and in response, provides the second control signal to each of the FETs to enable each of the FETs for the entirety of the phase of current of the power source signal such that the load connected between the third and the fourth terminals receives the power source signal.

5. The PSU of claim 1, wherein the controller is connected to a respective gate terminal of each of the FETs, wherein the controller provides the first control signal to each of the FETs to adjust a gate voltage of each of the FETs to enable each of the FETs for the fraction of the phase of current of the power signal.

6. The PSU of claim 5, wherein the controller provides the first control signal to each of the FETs to control a pulse width of the gate voltage of each of the FETs to enable each of the FETs for the fraction of the phase of current of the power signal.

7. The PSU of claim 1, wherein the power source is an alternating current (AC) power source, and the power signal is an AC power signal.

8. A power supply unit (PSU), including:
   an active bridge rectifier, including:
      a plurality of field effect transistors (FETs), including a first FET, a second FET, a third FET, and a fourth FET; and
      a controller connected to a respective gate terminal each of the FETs;
   an alternating current (AC) power source connected between first and second terminals of the active bridge rectifier; and
   a capacitor connected between third and fourth terminals of the active bridge rectifier,
   wherein the first terminal is positioned between the first FET and the fourth FET; the second terminal is positioned between the second FET and the third FET; the third terminal is positioned between the first FET and the second FET; and the fourth terminal is positioned between third FET and the fourth FET;
   wherein in a charging state:
      the controller performs, at a first time, zero-crossing detection of a voltage of an AC power signal from the AC power source at the first and the second terminals, and in response, provides a first control signal to each of the FETs to control a pulse width of a gate voltage of each of the FETs for a fraction of a phase of current of the AC power signal such that the capacitor is charged during the fraction of the phase by the AC power signal,
      the controller performs, at a second time after the first time, zero-crossing detection of voltage of the power signal from the power source at the first and the second terminals, and in response, provides the first control signal to each of the FETs to enable each of the FETs for the fraction of the phase of current of the power signal such that the capacitor is charged during the fraction of the phase by the power signal,
   wherein the fraction of the phase of current of the power signal is based on a magnitude of a capacitance of the capacitor.

9. The PSU of claim 8, wherein in an operating state:
   the controller provides a second control signal to each of the FETs to enable each of the FETs for an entirety of the phase of current of the power source signal such that a load connected between the third and the fourth terminals receives the power source signal.

10. The PSU of claim 9, wherein in the operating state:
   the controller determines a full charge capacity of the capacitor, and in response, provides the second control signal to each of the FETs to enable each of the FETs for the entirety of the phase of current of the power source signal such that the load connected between the third and the fourth terminals receives the power source signal.

11. A power supply unit (PSU), including:
an active bridge rectifier, including:
  a plurality of field effect transistors (FETs), including a first FET, a second FET, a third FET, and a fourth FET; and
  a controller connected to a respective gate terminal each of the FETs;
an alternating current (AC) power source connected between first and second terminals of the active bridge rectifier; and
a capacitor connected between third and fourth terminals of the active bridge rectifier,
wherein the first terminal is positioned between the first FET and the fourth FET; the second terminal is positioned between the second FET and the third FET; the third terminal is positioned between the first FET and the second FET; and the fourth terminal is positioned between third FET and the fourth FET
wherein in a charging state:
  the controller performs, at a first time, zero-crossing detection of a voltage of an AC power signal from the AC power source at the first and the second terminals, and in response, provides a first control signal to each of the FETs to control a pulse width of a gate voltage of each of the FETs for a fraction of a phase of current of the AC power signal such that the capacitor is charged during the fraction of the phase by the AC power signal,
wherein the fraction of the phase of current of the power signal is based on a magnitude of a capacitance of the capacitor.

12. The PSU of claim 11, wherein in an operating state:
the controller provides a second control signal to each of the FETs to enable each of the FETs for an entirety of the phase of current of the power source signal such that a load connected between the third and the fourth terminals receives the power source signal.

13. The PSU of claim 12, wherein in the operating state:
the controller determines a full charge capacity of the capacitor, and in response, provides the second control signal to each of the FETs to enable each of the FETs for the entirety of the phase of current of the power source signal such that the load connected between the third and the fourth terminals receives the power source signal.

* * * * *